United States Patent
Nunn et al.

(10) Patent No.: US 12,018,133 B1
(45) Date of Patent: Jun. 25, 2024

(54) SYSTEM AND METHOD OF ELASTANE REMOVAL FOR REPURPOSING TEXTILES

(71) Applicants: K Joy Nunn, Tulsa, OK (US); Susan H. Brown, Tecumseh, OK (US); Steven Brown, Tecumseh, OK (US)

(72) Inventors: K Joy Nunn, Tulsa, OK (US); Susan H. Brown, Tecumseh, OK (US); Steven Brown, Tecumseh, OK (US)

( * ) Notice: Subject to any disclaimer, the term of this patent is extended or adjusted under 35 U.S.C. 154(b) by 226 days.

(21) Appl. No.: 17/315,007

(22) Filed: May 7, 2021

(51) Int. Cl.
*C08J 11/24* (2006.01)
*C08J 11/14* (2006.01)

(52) U.S. Cl.
CPC .......... *C08J 11/24* (2013.01); *C08J 11/14* (2013.01); *C08J 2375/04* (2013.01)

(58) Field of Classification Search
CPC ... C08J 11/06; C08J 11/10; C08J 11/12; C08J 11/14; C08J 11/20; C08J 11/105; C08J 2375/02; C08J 2375/04; C08J 2375/08
See application file for complete search history.

(56) References Cited

U.S. PATENT DOCUMENTS

| 2010/0228000 A1* | 9/2010 | Waibel | C08J 11/08 528/310 |
| 2016/0283917 A1* | 9/2016 | Nunn | B09B 5/00 |

FOREIGN PATENT DOCUMENTS

| BR | 102013032157 A2 * | 12/2015 | |
| BR | 102021014992 B1 * | 8/2022 | B29B 17/0036 |

* cited by examiner

*Primary Examiner* — Frances Tischler
(74) *Attorney, Agent, or Firm* — Leavitt Eldredge Law Firm; Richard Eldredge

(57) ABSTRACT

A method of elastane removal from textiles that includes collecting textiles from sources, transporting the textiles to a collection facility, sorting, baling, and staging the materials, and then treating the materials with heat and chemicals to remove elastane from the textiles.

6 Claims, 4 Drawing Sheets

SYSTEM AND METHOD OF ELASTANE REMOVAL FOR REPURPOSING TEXTILES

BACKGROUND

1. Field of the Invention

The present invention relates generally to fabric systems and methods of use and more specifically to a method of elastane removal for repurposing of the elastane and textiles.

2. Description of Related Art

Fabric systems are well known in the art and are effective means of providing textiles for use in clothing or various other manufacturing processes. There are many textiles that include elastane, which may need to be removed from the textiles for recycling and further use of the textiles. It is an object of the present invention to provide methods for removal of elastane from textiles.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
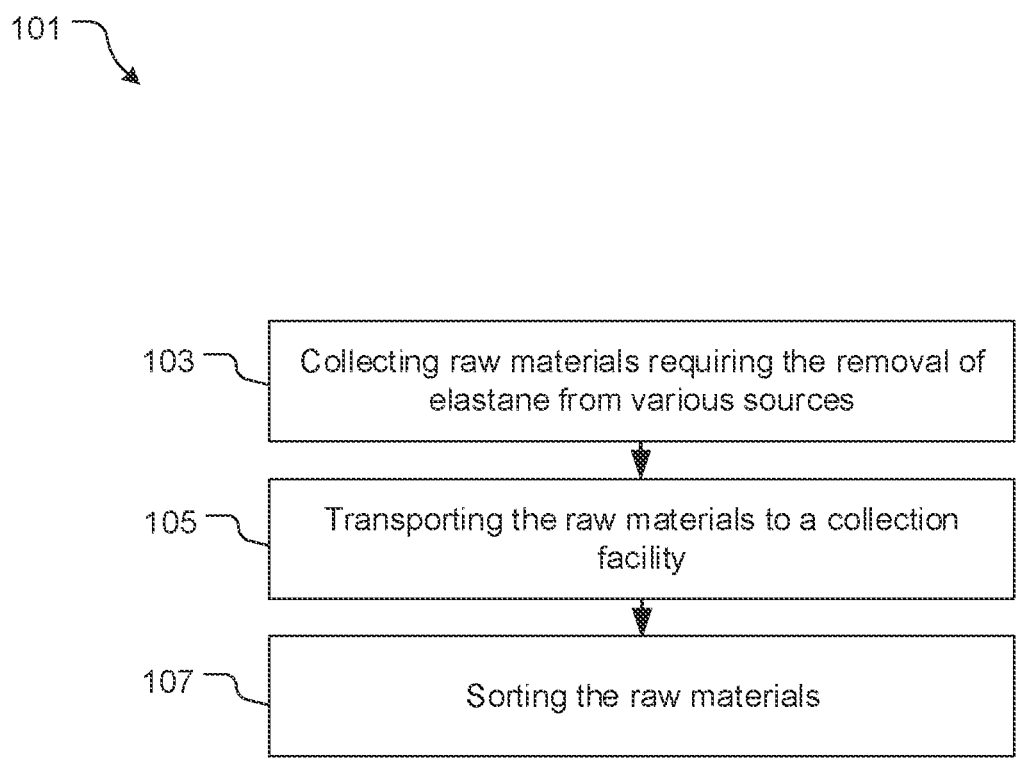
FIG. 1 is a flowchart of the initial step of material preparation in accordance with a preferred embodiment of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, the figures depict various embodiments of system and method of use in accordance with the preferred embodiment of the present invention. It should be understood that the embodiments discussed herein are substantially similar in form and function and share one or more of the features discussed in each embodiment although the features may not be shown specifically with reference to the particular embodiment.

Referring now to the drawings, FIG. 1 depicts a flowchart of the initial step of material preparation.

Elastane is an elastic polyurethane substance applied to textile fabrics whose applications are typically found in, but not limited to, hosiery, undergarments, body shapers, swimwear, athletic wear, shirts, and pants. Elastane is referenced as various brand identities dependent on the manufacturer which include, but are not limited to, the following: Spandex, Lycra, Elaspan, Acepora, Creora, INVIYA, ROICA, Dorlastan, and others. The textile material to which elastane is applied has value as fiber, yarn or filament when converted for repurposing in other applications. In the present invention, a method of elastane removal from textile raw materials to allow for repurposing extracted elastane to be employed in future textile applications is disclosed and described.

Material Preparation

FIG. 1, depicts a flowchart 101, of the initial step of material preparation. Textile raw materials requiring the removal of elastane for repurposing may be collected from sources which include, but are not limited to, textile cutting mills, post-consumer sources, and factories which produce textile waste and off-spec goods, 103. Textile raw materials which are collected for processing are transported to a collection facility, 105 and are then segregated according to specified data points, 107 in order to ensure full traceability based on the following parameters:

Composition: defined as percentage and type of fiber blends within the source material of the one or more textiles.

Color: defined by standard and fashion color range within the source material.

Count, Denier, Dtex, etc.: defined as the diameter of individual yarn, filament or fiber in the source material.

Surface Finish: defined as chemical(s) or surface application(s) applied to the exterior of the source material.

Textile Construction: defined as woven, non-woven, knit, etc.

Composition:

Source material compositions vary and are referenced as primary, secondary, etc. which reflect the yarn, filament or staple fiber percentages comprising a garment. Understanding the percentages of materials composition is critical in the economics of elastane removal. The collection and segregation of raw materials subject to elastane removal is determined by the percentage of the primary component, i.e. yarn, filament or fiber, and the percentage of elastane it contains. Primary fabric components typically include, but are not limited to, the following types of plant, animal, natural polymer, synthetic, and inorganic sources:

Cotton
Flax
Hemp
Bamboo
Nylon
Polyester
Rayon
Viscose
Modal
Lyocell
Acetate
Tri-Acetate
PLA
Camel
Mohair
Alpaca
Cashmere
Angora
Rabbit
Silk
Meta Aramids
Para Aramids
Polypropylene
Polyethylene
Several other types as well Elastane is typically blended with ratios of 3-40%, but can be as low as 1% or as high as 100%. Categorization of the composition blends are shown in the following table:

| Two Component Substrates | |
| --- | --- |
| Primary Fiber | Elastane |
| 99-95% | 1-5% |
| 94-85% | 6-15% |
| 84-75% | 16-25% |
| 74-65% | 26-35% |
| 64-50% | 36%-50% |
| <50% | >50% |

If there is 33% or more component(s) within the material, those are broken out by similar measures while keeping the elastane percentage within the same parameters as the preceding chart.

Color:

Sorting raw materials according to color is important in order to maximize the value of the material which will be further subjected to fiber rejuvenation technologies, thereby converting the subject material into staple fibers for placement in other textile related applications, or to pelletize the fibers to be extruded as filament yarn. Subject material color is the result of dye which may contain different chemicals depending on the type used. Related dyes are noted and grouped by type in order to ensure successful processing of the final material. Subject material color grouping adds customer value through cost reduction as it eliminates the need to re-dye, or in some cases, if re-dyeing or over-dyeing is necessary. Knowledge of dye type used in subject material provides for the adjustment of processing steps in downstream manufacturing which guards against adverse chemical reactions that may strip, damage, or interfere with the color or material.

Count, Denier, Dtex, etc.:

Count, Denier, Dtex, etc. data pinpoints source material density and thus facilitates collaboration with customers around new product development. Recipes for converting elastane-free source material through rejuvenation technologies are calculated in part through material density data derived from count, denier, detex, etc. analysis. Density data analysis confirms customer specifications and is integral in determining the material process parameters in downstream manufacturing.

Surface Finishes:

Source material surface finishes are identified by means of FTIR testing, SDS verification from supplier(s), and other assorted lab methodologies. Source material surface modifications caused by its finish create an adverse effect in downstream rejuvenation processing due to potential interference from dye streaking, repellency of other finishes, fiber breakage, loss of bonding, and/or various other possible negatively related outcomes. Source materials are segregated by surface finish type and processed, if necessary, to remove undesired finishes by means of organic chemical solution(s) designed specifically for the subject material finish. Source material surface finish types which are commonly removed include, but are not limited to, softeners, resins, soil release, water repellents, flame retardants, starches, silicones, as well as various other common or unique finishes.

Textile Construction:

Textile Construction type varies within the realm of textile manufacturing with the most commonly found types being knit, woven or non-woven. Knowledge of source material construction assists in determining the fabric density of the material, which then determines the most favorable downstream material processing techniques to be employed.

Process Technique

Figure 2:
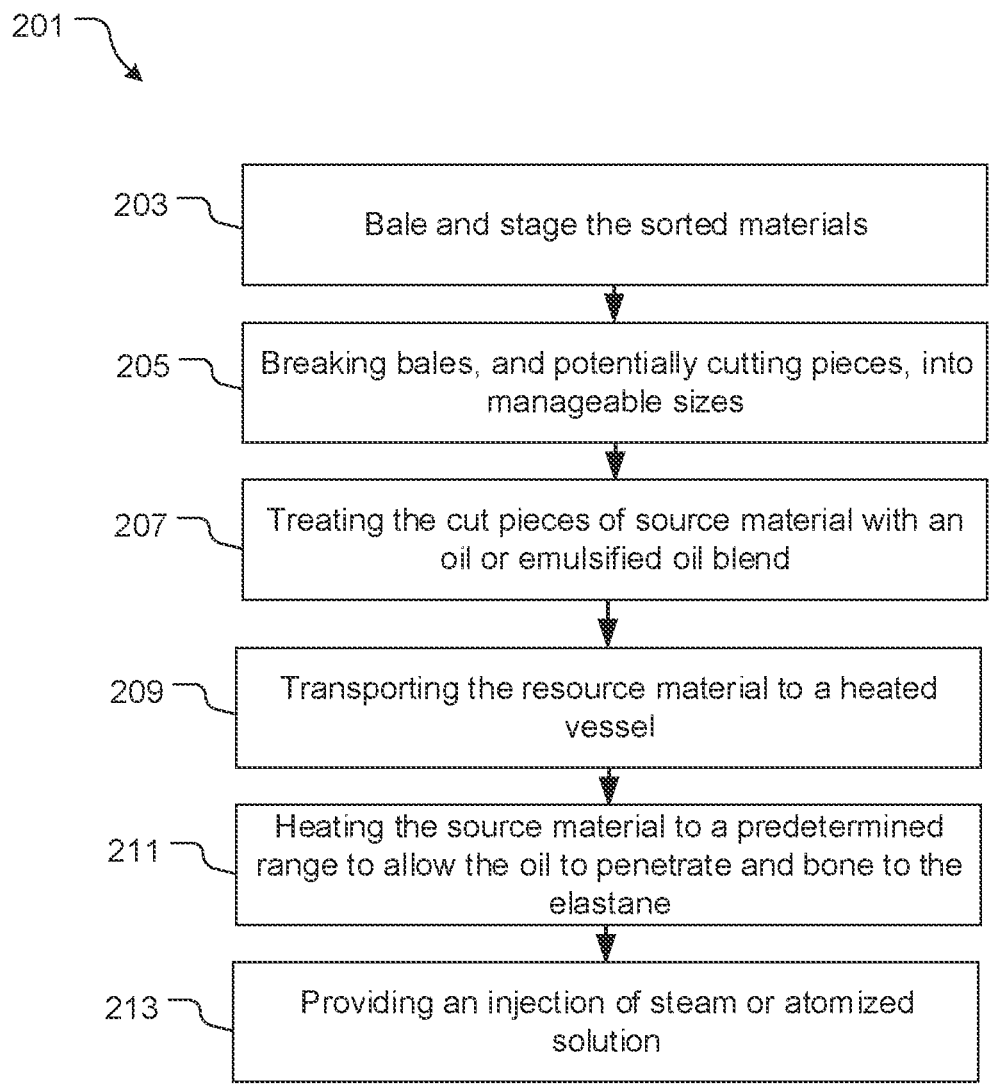
FIG. 2 is flowchart of a first method of processing sorted material in accordance with the present application.

The sorted material can be processed in one of two methods which are described below:

Process A:

FIG. 2 depicts a flowchart 201 of the first processes in accordance with the present invention. Once source materials are sorted, they are baled and staged in the manufacturing area waiting to be introduced into the processing sequence, 203. Individual bales are broken as processing begins and, depending on the dimensions of the individual pieces of source material, may need to be cut into manageable sizes by a cutting machine, 205 to create cut pieces of source material. Cut pieces of source material dimension may be between <0.5" to 12" on any given side; ideally material size is between 2" to 8" on any given side.

After source materials are resized, they are treated with an oil or emulsified oil blend, 207. One of more type(s) of oil used may include, but is not limited to the following:

Common oils like coconut, corn, canola, cottonseed, olive, palm, peanut, rapeseed, safflower, soybean.

Nut oils like almond, beech nut, brazil nut, cashew, hazelnut, macadamia, mongongo, pecan, pine nut, pistachio, walnut, pumpkin seed.

Citrus oils like grapefruit seed, lemon, orange.

Melon or gourd seed oils like bitter gourd, bottle gourd, buffalo gourd, butternut squash seed, Egus seed, watermelon seed.

Other edible oils like amaranth, apricot, apple seed, argan, avocado, babassu, ben oil, borneo tallow nut, cape chestnut, carob pod, cocoa butter, cocklebur, cod, cohune, coriander seed, date seed, dika, false flax, grapeseed, hemp, kapok, kenaf seed, lallemantia, mafura, marula, meadowfoam seed, mustard seed, Niger seed, nutmeg, okra seed, papaya seed, perilla seed, persimmon seed, pequi, pili nut, pomegranate seed, poppy seed, pracaxi, prune kernel, quinoa, ramtil, rice bran, royle, sacha inchi, sapote, seje, shea butter, taramira, tea seed, thistle, tigernut, tobacco seed, tomato seed, wheat germ.

Multi-purpose oils like castor, colza, radish, salicornia, tung.

Non-edible oils like copaiba, jatropha, jojoba, milk bush, nahor, paradise, petroleum nut, pongamia, armur cork tree fruit, artichoke, astrocaryum murumuru butter, balanos, bladderpod, brucea javanica, burdock, buriti, candlenut, carrot seed, chaulmoogra, crambe, croton, cuphea, Cupuacea butter, honesty, illipe butter, mango, mowrah butter, neatsfoot, neem, ojon, passion fruit, rosehip, rubber seed, sea buckthorn, sea rocket seed, snowball seed, tall, tamanu, ucuuba seed.

Types of oils or oil mixtures utilized are dependent on various factors which include, but are not limited to, the following:

Primary composition of source material and percentage of elastane present.

Required process parameters used to achieve breakdown of elastane in the source material without damage to the material.

Dyes used, if present.

Textile construction.

Downstream processing specifications.

Since there are various material types that can be treated, each type or group has particular limits which cannot be exceeded or damage occurs to the primary component fibers in the material, which may render them useless for downstream repurposing. The unique chemistries found in various oils or groups of oils are able to complement and protect the primary component fibers of source materials while bonding, and simultaneously breakdown the attendant elastane element to a resin stage during the invention process.

The oil or oil mixtures may, or may not be, diluted using an appropriate emulsifying agent, chemicals, and other liquids that are suited to the types of oil or oil mixtures. The purpose of dilution is to ensure cost effective measures are being implemented and to assist in the penetration of the source materials to provide a homogenous distribution of the treatment. Oils possess various ranges of viscosity which may be adjusted to accommodate any challenges that may occur during application. These oils may be modified to more manageable viscosities through the use of emulsifiers and low viscosity liquids like water, chemicals, or blends of lower viscosity oils.

The oil or oil mixtures are calculated and applied by factoring the percentage of source material weight. The amount of oil or oil mixtures administered may be dependent upon variables which include the primary material type, textile construction, dye material, etc., and acceptable ranges can be as low as 10% to over 200%. For example, when processing 500 lbs. of source material, in either batch or continuous process mode, with a primary material that requires a 100% application of the oil mixture, 500 lbs. of the oil mixture would be applied to the material. If 20% of the mixture is required, then 100 lbs. of the oil mixture would be applied. Varying amounts of oil mixture reflect the overall density of the source material and/or the amount of elastane present in the material. Methodology of oil application includes, but is not limited to, spraying, submersion, and/or calendar roll.

Manufacturing Process

Continuing with the flowchart of FIG. 2. Once the prescribed oil or oil mixture is applied, the resource material is transported by conveyor or air duct to a heated vessel, 209. The vessel may be a type which is designed for a batch system, or a continuous feed process system for larger operations. Either system may use a heat application of one or more methods such as convection, direct, indirect, radiant, or conduction in order to provide processing temperature ranges of 80° F. to 500° F., or greater. The process heats the source materials to a predetermined range of temperature which allows the oil or oil mixture to penetrate and bond quickly to the elastane, causing its chemical structure to change and turning it to resin, 211. The ideal temperature range for a majority of source materials is between 200F and 450F. Source material process times vary depending on the composition percentages of primary fibers and elastane found in the material, textile construction, and density. For example, a light weight resource material like that used to manufacture lingerie may only require a few minutes of process time, while a more dense resource material like a nylon blend used in swimwear may require longer process time. Thus, material composition such as 80% nylon and 20% elastane utilized in swimwear requires a temperature range between 365F and 435F for more than 10 minutes, but less than 30 minutes, depending upon the volume being processed at the time.

Due to the heat-sensitive nature of certain primary source materials to heat, an injection of steam or atomized solution may be required, 213. This supplemental steam, or solution, aids in processing to reduce potential damage to the primary source materials being treated. The injection may be applied directly, or indirectly, inside the vessel in order to protect the primary source material and assist in the penetration of the oil or oil mixture into the material. The steam may be superheated steam, saturated steam, unsaturated steam, or an atomized mist. Additional chemistries may include, but are not limited to, soda ash, salts, softeners, and pH influencing chemicals which may be safely utilized within the prescribed operating temperature ranges. Altering pH chemistry of steam applications may affect the appearance of certain dyes and is ideal for source materials which are candidates for re-dying such as mixed prints, dated fashion colors, and off-specification materials which do not satisfy customer requirements. Higher pH solutions increase the likelihood that primary resource materials will fade or become discolored due to the bleach-like properties occurring in the higher alkalinity. This procedure is performed sparingly to achieve the desired results.

Figure 3:
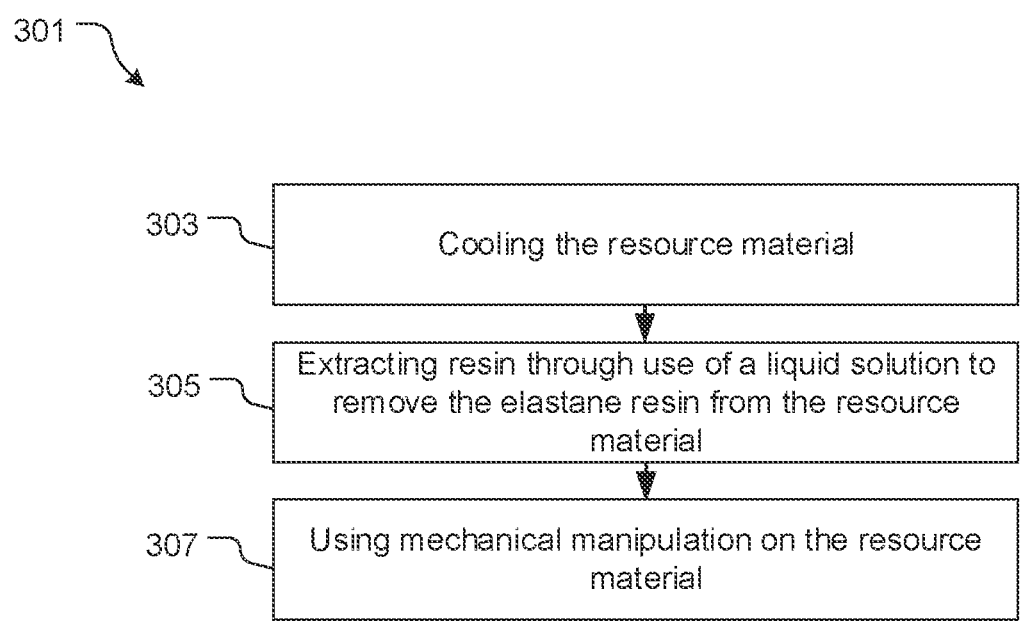
FIG. 3 is a flowchart of an extraction process in accordance with the present application is shown.

Extraction Process:

As shown in FIG. 3, flowchart 301, once the resource material has completed the heat treatment process, it is transported to the next stage by conveyor or air duct system where it may be cooled by forced air and/or water if necessary prior to introduction to the resin extraction process, 303. The cooling stage reduces the temperature of the resource material and resin to ranges below 350F, but no more than 110F. This is only limited by the nature of the chemical solution used in the next stage process of extraction.

Resin extraction occurs through the use of a liquid solution which may include various chemicals and/or enzymes which are combined with water. The purpose of the chemical solution bath is to remove the elastane resin from the resource material by means of one or more of the following: emulsification, dissolving, and/or lifting the resin from the primary resource material, 305. The chemical reaction producing extraction occurs as a result of the formulated chemistry chain created within the mixture. The chemical chain is comprised of negatively charged polar-hydrophilic heads and uncharged non-polar hydrophobic tails. The non-polar portion of the chemical chain penetrates into the resin and oil solution thus resulting in the extracted material cleaving to the surface of the tail. The hydrophilic head in the chain interacts with the surrounding water and/or liquid molecules to which they are attracted. The head of the chain continues to insinuate itself into the resin and oils, ultimately encapsulated and emulsified in the surrounding liquids.

Chemicals which may be used for the extraction of resin include, but are not limited to, one or more types of surfactants, enzymes, alkalines, salts, alcohols, solvents, acids, wetting agents, and emulsifiers. The following list includes, but is not limited to, chemicals which may be utilized in resin extraction:

Sodium Carbonate
Sodium Metasilicate
Sodium Chloride
Sodium Hydroxide
Sodium Salts
Potassium Salts
Sodium Xylene Sulfonate
Ethyl Alcohol
Ethylenediaminetetraaceate (EDTA)
Dipolar Aprotic Solvents
Polar Solvents
Non-polar Solvents
Benzenesulfonic Acid
Diethylene Glycol Monobutyl Ether
Dimethylsulfoxide
Potassium Hydroxide
Glycerin
Gylocols
Isopropyl Alcohol
Potash
Alkylbenzene Sulfonates
Lauryl Sulfate or Sodium Laureth Sulfate
Polyalcohols
Palmitic Acid
Ethoxylated Alcohols
Ammonia
Amines Amides
D-limonene
Ethanolamine
Sulfated Alkanolamides
Glyceride Sulfates
Alkyl Sulfates
Alkyl Ether Sulfates
Hydrotropes
Alpha Olefin Sulfonates
Lignosulfonates
Sulfo-carboxylic Compounds
Organo Phosphored Surfactants
Alcyl Amino Acids
Ethoxylated Alkyl Phenols
Fatty Acid Esters
Fatty Amines
Alkylpolyglucosides
Ethleneoxide/Propyleneoxide Copolymers
Polyalcolols and Ethoxylated Polyalcohols
Ethoxylated Thiols
Esters of Hexitols and Cyclic Anhydrohexitols
Linear Alkl-amines and Alkyl-ammoniums
Quarternary Alkyl-ammoniums (Quats)
Amino-acids
Alkanol-amides
Oxy- and Ethoxy-amines
Amino Propionic Acids
Acetone
Proteases
Amylases
Lipases
Cellulases
Mannanases
Pectinases In addition to the use of a liquid solution during the process of elastane removal, it may become necessary to employ mechanical manipulation of the resource material, depending on the amount of resin produced and the viscosity of the oil solution used, 307. The liquid element would eventually remove all of the resin and oil, but the addition of mechanical manipulation exacerbates the removal process by increasing the rate at which the chemistries remove the resin and oil, which results in a more efficient manufacturing performance. Mechanical manipulation enhances the rinsing portion of the process to completely remove the chemistries from the resource material. Forms of mechanical manipulation may occur by means of one or more methods such as agitator(s), vacuuming and/or thrusting of the liquid solution through the resource material, applied pressure methods such as hydraulic pressure, calendaring, or other methods to fully remove resin from the primary resource material. Once resin and oils or oil mixtures are sufficiently removed from the resource materials, they are dried by heated air and transported by conveyor or air duct system(s) to be baled and packaged.

Figure 4:
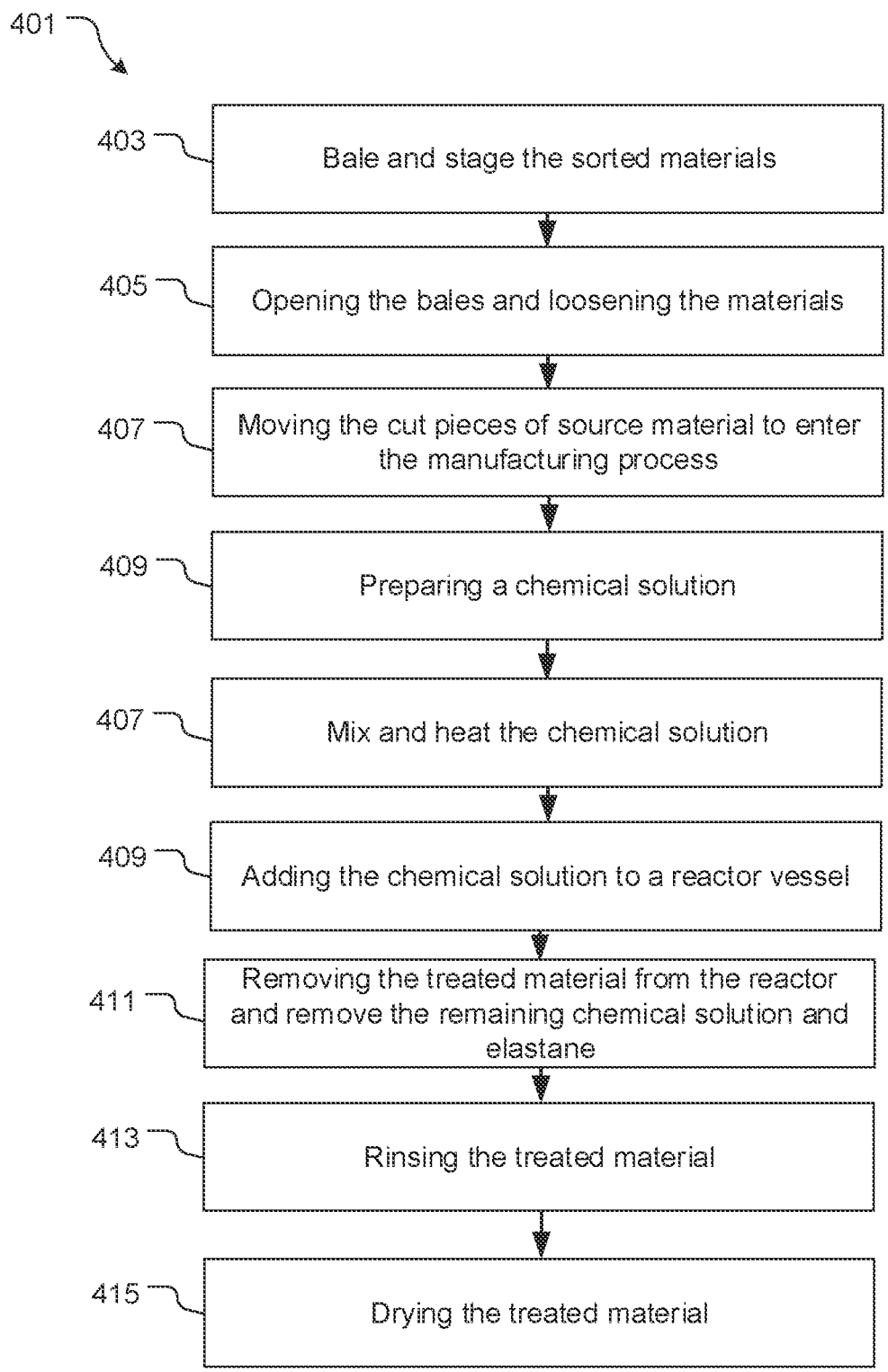
FIG. 4 is flowchart of a second method of processing sorted material in accordance with the present application.

Process B (Preferred):

As shown in FIG. 4, an alternative process is describe in flowchart 401. After the sorting process as described above in the materials preparation section, the material bales are staged for the manufacturing process, 403. Bales are opened to loosen the materials before entering the process and cut if necessary, 405. The cut pieces of source material enter the manufacturing process by either (a) in a free flowing manner by being conveyed and then dropped vertically into a perforated basket or like type containment structure which is lowered into a heated reactor or suitable vessel or (b) directly into a screw conveyor reactor for a more continuous process, 407.

A chemical solution is prepared which is comprised of a solvent with preference to dipolar aprotic solvents and a sweetener or catalyst boosting chemical, 409. The solvent types which primarily include but are not limited to dipolar aprotic solvents are dimethylformamide (DMF), hexamethyl phosphoramide (HMPA), pyridine (Pyr), N-ethyl-2-pyrrolidone, N-butyl-2-pyrrolidone, 2-methyltetrahydrofuran hydroxymethylfurfural (HMF), N-methyl-2-pyrrolidone (NMP) dimethyl sulfoxide (DMSO), crown ethers, or other solvents such as hexane. The polar aprotic solvent type is determined by the material composition being processed. The sweetener or catalyst boosting chemical is dependent upon the type of polar aprotic solvent used include but not limited to any of the following: sugar alcohols such as maltitol, sorbitol, xylitol, erythritol, isomalt, mannitol, glycyl alcohol, glycerin and others, polyethylene oxide, polyethylene glycol (PEG), polypropylene glycol, hydrogenated starch hydrolysates, etc. The ratio of solvent to sweetener is 5:1 to 25:1, with a preference between a 10:1 to 20:1.

The chemical solution is mixed and heated in a chemical tank, 409. The temperature ranges in which the chemical is heated to is limited by the flashpoints of the mixture. Example, in a 10:1 mixture of DMSO with glycyl alcohol, the processing temperature would typically be above 70C and below 140C with a safe range of temp being between 115C to 125C. The heated solution is recirculated through the processing reactor vessel, 411. By using a continuous or periodic recirculating method, the chemical solution can be filtered to remove the elastane resin which increases the number of uses of the chemical solution before it undergoes distillation.

Once the material is in the heated chemical solution, it is processed between 3-45 minutes. The amount of elastane, temperature, and agitation of the solution is what determines the processing times. A process time using DMSO and glycyl alcohol on fabrics containing 20% elastane and 80% nylon can be processed as quick as 5 min when using max temperatures and a high circulation rate with an agitator in the vessel or 30 minutes with no recirculation or agitation at temperatures of 115C-125C.

Once the timed cycle of the chemical solution treatment has finished, the treated material is removed from the reactor and conveyed through a press to squeeze the remaining chemical solution and any residual elastane that may have redeposited or lingered in the fabric during removal, 411. The material can be pressed using a single or a series of hydraulic platen presses or by a single or series of calendaring presses. The main goal is to utilize a heavy applied pressure to the fabric to remove chemicals and remaining elastane without damaging the material.

Upon completion of the pressing stage, the material is rinsed in either (a) steam: super-heated or high heat, or (b) in cases where additional processing for more difficult fabrics a second dosing of the heated solution used in the first process stage may be required followed by a steam rinse, 413. Material is then dried via conventional methods of heated air dryers or any other suitable industrial drying systems, 415. The dried materials are then baled and packaged for next stage processing.

Once a majority of the various chemical solution recipes, described in Process A or Process B, begin to lose efficiency, it can be easily distilled and re-utilized numerous times in order to improve the cost effectiveness of the process making it very commercially viable. These solutions are filtered at all stages for the removal of elastane which can be collected and reused in other applications downstream.

The embodiments disclosed above are illustrative only, as the embodiments may be modified and practiced in different but equivalent manners apparent to those skilled in the art having the benefit of the teachings herein. It is therefore evident that the embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method of elastane removal from textile raw materials, the method comprising:
    collecting one or more textiles from one or more sources;
    transporting the one or more textiles to a collection facility;
    sorting the one or more textiles based on one or more data points based on one or more parameters to create a sorted material;
    baling and staging the sorted material to create one or more bales of the sorted material;
    breaking and cutting the one or more bales of the sorted material to create cut pieces of source material;
    treating the cut pieces of source material with an oil to create a resource material;
    transporting the resource material to a heated vessel to process the resource material at a temperature of a predetermined range, wherein the temperature causes the oil to penetrate and bond to an elastane of the resource material, turning the elastane into a resin;
    providing an injection of steam to the resource material:
    cooling the resource material;
    subjecting the resource material to a liquid solution;
    extracting the elastane resin from the liquid solution; and
    removing the elastane resin from the liquid solution.

2. The method of claim 1, wherein the one or more parameters include composition, color, count, surface finish, and textile construction.

3. The method of claim 1, wherein the oil is an oil mixture.

4. The method of claim 1, wherein a calculated amount of oil is used by factoring a percentage of a weight of the cut pieces of source material.

5. The method of claim 1, wherein the heated vessel applies heat through one or more of convection, direct, indirect, radiant, or conduction.

6. The method of claim 1, wherein the predetermined range is 80° F. to 500° F.

* * * * *